(12) United States Patent
Hamm et al.

(10) Patent No.: US 11,541,835 B2
(45) Date of Patent: Jan. 3, 2023

(54) VEHICLE SEAT

(71) Applicant: ADIENT ENGINEERING AND IP GMBH, Burscheid (DE)

(72) Inventors: Jean-Luc Hamm, Hoerdt (FR); Benjamin Joerke, Zuchering (DE); Benjamin Guenther, Solingen (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/312,418

(22) PCT Filed: Dec. 11, 2019

(86) PCT No.: PCT/EP2019/084546
§ 371 (c)(1),
(2) Date: Jun. 10, 2021

(87) PCT Pub. No.: WO2020/120526
PCT Pub. Date: Jun. 18, 2020

(65) Prior Publication Data
US 2022/0017034 A1 Jan. 20, 2022

(30) Foreign Application Priority Data

Dec. 11, 2018 (DE) .................... 10 2018 131 810.3
Dec. 20, 2018 (DE) ...................... 10 2018 133 243.2

(51) Int. Cl.
*B60R 21/207* (2006.01)
*B60N 2/64* (2006.01)
*B60R 21/2165* (2011.01)
*B60R 21/16* (2006.01)

(52) U.S. Cl.
CPC .............. *B60R 21/207* (2013.01); *B60N 2/64* (2013.01); *B60R 21/2165* (2013.01); *B60R 2021/161* (2013.01)

(58) Field of Classification Search
None
See application file for complete search history.

(56) References Cited

U.S. PATENT DOCUMENTS

| 5,816,610 A | 10/1998 | Higashiura |
| 6,055,151 A | 4/2000 | Torney |
| 7,306,278 B2 | 12/2007 | Holdampf |
| 8,807,591 B2 * | 8/2014 | Nakata ................. D05B 23/00 |
|  |  | 280/730.2 |
| 2006/0066078 A1 | 3/2006 | Hofmann |
| 2014/0070595 A1 | 3/2014 | Mitsuaki |

(Continued)

FOREIGN PATENT DOCUMENTS

| DE | 19 603 106 A1 | 7/1997 |
| DE | 10118359 A1 * | 10/2002 ............... B60N 2/58 |

(Continued)

OTHER PUBLICATIONS

PCT International Search Report and Written Opinion (PCT/EP2019/084546).

*Primary Examiner* — Faye M Fleming
(74) *Attorney, Agent, or Firm* — Marshall & Melhorn, LLC

(57) ABSTRACT

A vehicle seat may have a seat part and a backrest. The backrest may have a foam component with a cavity for receiving at least part of an airbag device. The foam component may be lined at least to some extent with a reinforcing layer arrangement in the region of the cavity.

15 Claims, 3 Drawing Sheets

(56) References Cited

U.S. PATENT DOCUMENTS

2018/0015899 A1  1/2018 Seo
2021/0122324 A1* 4/2021 Hensel ................ B60R 21/2176
2021/0380063 A1* 12/2021 Huf ...................... B60N 2/4221

FOREIGN PATENT DOCUMENTS

| | | | |
|---|---|---|---|
| DE | 20318978 U1 * | 4/2004 | ............... B60N 2/58 |
| DE | 102009016887 A1 * | 10/2010 | ........... B60N 2/7017 |
| DE | 10 2013 203 582 B4 | 6/2017 | |
| EP | 0 990 566 A2 | 4/2000 | |
| EP | 1 199 227 B1 | 10/2001 | |
| EP | 1 201 510 B1 | 10/2001 | |
| EP | 2 960 116 B8 | 8/2017 | |
| EP | 2 979 933 B1 | 6/2018 | |
| FR | 2806685 A1 * | 9/2001 | ........... B60N 2/5825 |

* cited by examiner

VEHICLE SEAT

FIELD

The invention relates to a vehicle seat comprising a seat part and a backrest, said backrest having a foam component with a cavity for receiving at least part of an airbag device.

BACKGROUND

EP 1 199 227 A1 discloses a vehicle seat comprising a subassembly consisting of a backrest and an airbag module, wherein the backrest has a frame, a padding and a covering part, and wherein the airbag module has an ejection channel which is attached to the frame. The covering part is configured in a rigid manner, whilst the padding is configured in a flexible manner in the region of the transition to the covering part such that, by the deformation of the padding, a gap may be formed between the covering part and the padding for the airbag to emerge from the backrest.

A safety device for motor vehicles comprising at least one airbag module which may be integrated in a vehicle seat is disclosed in EP 1 201 510 A1, said airbag module comprising a prefabricated modular unit, which may be handled as a cohesive whole and which has at least one inflatable airbag which serves in particular as a side airbag, as well as a gas generator, wherein a structural element forming at least one part of a rear wall of the vehicle seat is additionally configured as a module cover for the modular unit. The structural element has at least one region which may be broken open, torn open, swiveled open and/or pivoted away by the inflating airbag and which is provided with a predetermined breaking point.

EP 2 960 116 B1 discloses a far-side airbag device comprising a side airbag which is provided in a vehicle width direction on a vehicle center side of a backrest on a side portion, wherein the side airbag has a rear inflation portion which is inflated and deployed when it is supplied with gas and which restrains at least the rear parts of the chest and the abdomen of a seated occupant. A far-side airbag device is able to take into account the so-called secondary movements, i.e. the movements of the vehicle occupants after the first contact with the airbag after an accident and reduce the consequences thereof.

A vehicle comprising two adjacently arranged individual seats is disclosed in DE 196 03 106 A1, said individual seats each containing on the sides thereof remote from one another at least one side airbag which is accommodated in an associated side element of the upper seat back region, wherein the upper seat back regions extend with the side elements thereof substantially to the side beyond the lower seat back regions as far as the vicinity of the adjacent vehicle structure.

SUMMARY

The object of the invention is to improve a vehicle seat of the type mentioned in the introduction, in particular to permit an integration of a far-side airbag device. In particular, a guidance of an airbag out of a foam component is designed to be improved. In particular, a predetermined breaking point in a foam component is designed to enable the airbag to emerge from the foam component in a reliable manner. Airborne foam particles are designed to be minimized during the deployment of the airbag.

This object is achieved according to the invention by a vehicle seat having the features of the claims.

An integration of a far-side airbag device into the backrest is made possible by the foam component being lined at least to some extent with a reinforcing layer arrangement in the region of the cavity. In particular, a guidance of an airbag out of the foam component is improved.

Advantageous embodiments which may be used individually or in combination with one another form the subject matter of the subclaims.

The reinforcing layer arrangement may have at least two reinforcing layers. The reinforcing layer arrangement may have exactly two reinforcing layers.

The reinforcing layer arrangement has at least one reinforcing layer. The reinforcing layer arrangement preferably has a first reinforcing layer and a second reinforcing layer. An outer end region of the first reinforcing layer and an outer end region of the second reinforcing layer may form or receive therebetween a predetermined breaking point of the foam component. As a result, the deployed airbag is guided toward the predetermined breaking point in order to prevent undesired tearing of the foam component in other regions.

At least two of the reinforcing layers may be positioned relative to one another such that they form and/or line a predetermined breaking point in the foam component. The predetermined breaking point may be configured as a notch in the foam component. The predetermined breaking point may be configured as a material weakening in the foam component. The predetermined breaking point may be configured as an incision in the foam component.

At least two of the reinforcing layers may be positioned at an angle relative to one another and as a result form a predetermined breaking point. Preferably, a reinforcing layer which is arranged in the direction of travel upstream of the airbag has a particularly high degree of strength. The reinforcing layer arrangement provides protection for the foam component from undesired tearing as well as guidance for the airbag.

The foam component may have a first flange, a second flange and a web connecting the first flange to the second flange, which define the cavity. The web preferably runs substantially parallel to a plane defined by a longitudinal direction and a vertical direction. The predetermined breaking point may be configured in the web. An outer end region of the first reinforcing layer and/or an outer end region of the second reinforcing layer may be foamed into the web.

In a region of the predetermined breaking point of the foam component, an outer end region of the second reinforcing layer may be oriented approximately perpendicularly to an outer end region of the first reinforcing layer.

In a region of the predetermined breaking point of the foam component, an outer end region of the second reinforcing layer may run approximately parallel to an outer end region of the first reinforcing layer.

The two reinforcing layers may overlap one another in some sections. At least one of the two reinforcing layers may be a non-woven material. At least one of the reinforcing layers may be a protective layer. At least one of the reinforcing layers may be produced from a woven material. At least one of the reinforcing layers may be produced from a plastics material. At least one of the reinforcing layers may be produced from a textile material. At least one of the reinforcing layers may be produced from a leather material.

At least one of the reinforcing layers may be arranged on a rear face of the foam component. At least one of the two reinforcing layers may be arranged between an airbag device and a rear face of the foam component.

At least one of the reinforcing layers may be configured two-dimensionally. At least one of the reinforcing layers may be configured three-dimensionally.

At least one of the reinforcing layers may be adhesively bonded to the foam component. At least one of the reinforcing layers may be positively connected to the foam component. At least one of the reinforcing layers may be connected by means of static friction to the foam component. At least one of the reinforcing layers may be back-foamed with the foam component. At least one of the reinforcing layers may be foamed into the foam component at least in some sections.

In addition to a predetermined breaking geometry introduced into the foam component (predetermined breaking point, for example a slot) in a region of the foam component (B-side) remote from the occupant, a non-woven material or reinforcing material for reinforcement and a further angled-back non-woven material or reinforcing material may be arranged along the predetermined breaking geometry. As a result, the foam component tears at the predetermined breaking point along the first reinforcing layer (of the angled-back non-woven material) or along the second reinforcing layer or along the two reinforcing layers.

At least one of the reinforcing layers may be provided by coating or laminating with an anti-adhesion effect on the side facing the airbag.

BRIEF DESCRIPTION OF THE FIGURES

The invention is described in more detail hereinafter with reference to an advantageous exemplary embodiment shown in the figures, as well as three modifications of this exemplary embodiment. However, the invention is not limited to this exemplary embodiment and the modifications thereof. In the drawings.

DETAILED DESCRIPTION

Figure 1:
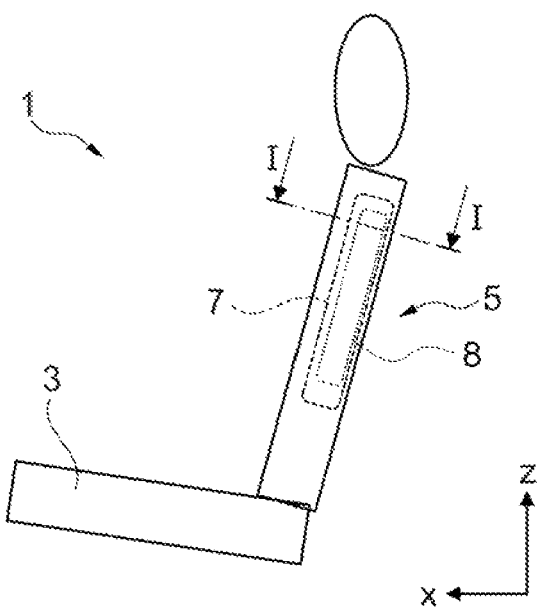
FIG. 1: shows a schematic side view of a vehicle seat according to the invention.

FIG. 1 shows schematically a vehicle seat 1 for a vehicle, in particular for a motor vehicle. The view of the vehicle seat 1 in FIG. 1 relates both to an exemplary embodiment shown in FIG. 2 and to three modifications of the exemplary embodiment shown in FIGS. 3 to 5.

The vehicle seat 1 is described hereinafter by the use of three spatial directions running perpendicularly to one another. In the case of a vehicle seat 1 installed in the vehicle, a longitudinal direction x runs substantially horizontally and preferably parallel to a vehicle longitudinal direction which corresponds to the usual direction of travel of the vehicle. A transverse direction y running perpendicularly to the longitudinal direction x is also horizontally oriented in the vehicle and runs parallel to a vehicle transverse direction. A vertical direction z runs perpendicularly to the longitudinal direction x and perpendicularly to the transverse direction y. In the case of a vehicle seat 1 installed in the vehicle, the vertical direction z runs parallel to the vehicle vertical axis.

The positional and directional information used, such as for example front, rear, top and bottom, relate to a viewing direction of an occupant seated in the vehicle seat 1 in the normal sitting position, wherein the vehicle seat 1 is installed in the vehicle in a position of use which is suitable for passenger conveyance with an upright backrest 5 and is oriented in the conventional manner in the direction of travel. The vehicle seat 1 according to the invention, however, may also be installed in a different orientation, for example transversely to the direction of travel.

The vehicle seat 1 has a seat part 3 and the backrest 5. An airbag device 8 is arranged in a cavity 7 in the backrest 5. The airbag device 8 comprises an airbag, which in the case of an accident may be deployed to the side (substantially parallel to the transverse direction y) in the direction of an adjacent vehicle seat or in the direction of a vehicle structure, for protecting a passenger seated in the vehicle seat 1.

Figure 2:
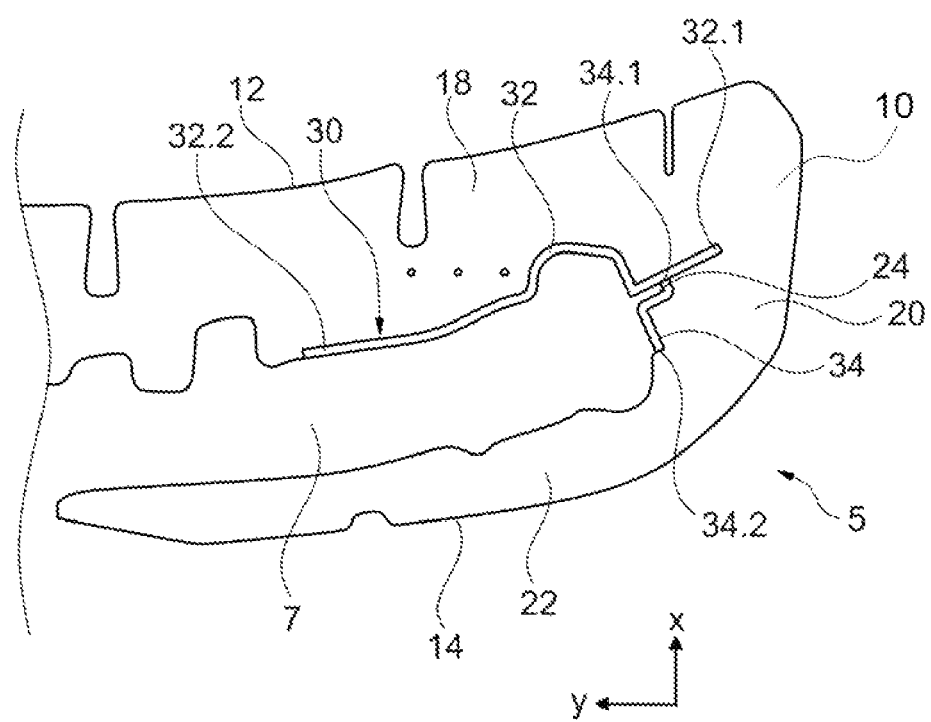
FIG. 2: shows a section through a backrest of the vehicle seat according to the invention according to the exemplary embodiment, along the line I-I in FIG. 1, FIG. 3: shows a section through a backrest of a vehicle seat according to the invention according to a first modification of the exemplary embodiment, along the line I-I in FIG. 1, FIG. 4: shows a section through a backrest of a vehicle seat according to the invention according to a second modification of the exemplary embodiment, along the line I-I in FIG. 1, and FIG. 5: shows a section through a backrest of a vehicle seat according to the invention according to a third modification of the exemplary embodiment, along the line I-I in FIG. 1.

FIG. 2 shows a section through a backrest 5 of a vehicle seat 1 according to the invention, according to an exemplary embodiment.

The backrest 5 has a load-bearing back structure, not shown in FIG. 2, a foam component 10 and a seat cover, not shown in FIG. 2. The foam component 10 has a front face 12 facing the occupant of the vehicle seat 1, and a rear face 14 remote from the occupant. The cavity 7 receives therein the back structure, not shown in the figures, as well as the airbag device 8. The cavity 7 is provided in the foam component 10. In an outer region of the cavity 7 the foam component 10 has a U-shaped cross section with a first flange 18, a web 20 and a second flange 22. The first flange 18 is a region of the foam component 10 facing the occupant and runs substantially parallel to the transverse direction y. The first flange 18 transitions into the web 20 in the region of an outer face of the vehicle seat 1. The web 20 runs substantially parallel to the longitudinal direction x. The web transitions into the second flange 22 in an end region of the web 20 remote from the first flange 18. The second flange 22 is a region of the foam component 10 remote from the occupant and runs substantially parallel to the transverse direction y. The second flange 22 is sword-shaped and is oriented in the direction of a seat center of the vehicle seat 1. The cavity 7 is open in the direction of the seat center.

A predetermined breaking point 24 is configured in the web 20 of the foam component 10 defining the cavity 7. In the present case, the predetermined breaking point 24 is configured in the foam component 10 as a notch which extends from the cavity 7 in the direction of the outer face of the vehicle seat 1, in the present case substantially in the transverse direction y. The predetermined breaking point 24 runs only partially through the web 20. The predetermined breaking point 24 preferably extends in the vertical direction z over at least the entire height of the airbag, in particular over the entire height of the cavity 7. In the case of an airbag deployed during an accident, the web 20 of the foam component 10 tears entirely in the direction predetermined by the predetermined breaking point 24 such that the airbag (optionally by severing a tear seam in the seat cover) is able to emerge from the vehicle seat 1 and adopt a position protecting the occupant.

In the region of the airbag device 8 the foam component 10 is at least partially reinforced by a substantially planar reinforcing layer arrangement 30, such that in the case of a deployed airbag the foam component 10 is able to tear only starting from the predetermined breaking point 24 and only in a predetermined direction.

In the present case, the reinforcing layer arrangement 30 comprises a first reinforcing layer 32 and a second reinforcing layer 34 which are respectively configured in the present case as a separate three-dimensionally shaped non-woven material.

Viewed in the transverse direction y, an outer end region 32.1 of the first reinforcing layer 32 is foamed into the web 20 of the foam component 10. The outer end region 32.1 runs parallel to the predetermined breaking point 24 but penetrates deeper into the web 20 in the direction of the seat outer face than the predetermined breaking point 24. The remaining region of the first reinforcing layer 32 forms a separating layer between the first flange 18 and the cavity 7 and, starting from the outer end region 32.1, runs in the direction of the seat center and terminates in an inner end region 32.2.

Viewed in the transverse direction y, an outer end region 34.1 of the second reinforcing layer 34 is foamed into the web 20 of the foam component 10. An outer end region 34.1 runs along the predetermined breaking point 24 and terminates in a truncated manner on the first reinforcing layer 32. The remaining region of the second reinforcing layer 34 forms a separating layer between the web 20 and the cavity 7 and, starting from the outer end region 34.1, runs substantially parallel to the longitudinal direction x and terminates in the inner end region 34.2.

Figure 3:
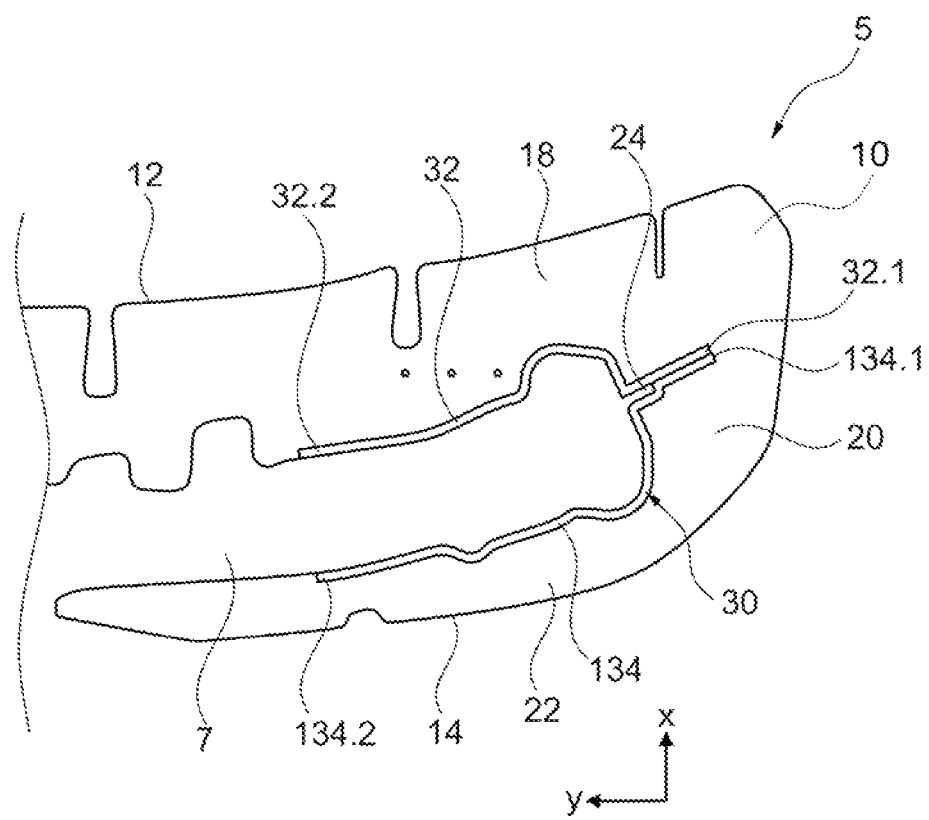

A first modification of the exemplary embodiment shown in FIG. 3 corresponds to the exemplary embodiment, apart from the differences described below, which is why components which are the same or similar-acting bear the same reference numerals. Relative to the exemplary embodiment shown in FIG. 2, only a second reinforcing layer 134 is configured differently. The second reinforcing layer 134 is configured to be larger relative to the second reinforcing layer 34 of the exemplary embodiment shown in FIG. 2, viewed in the transverse direction y.

Viewed in the transverse direction y, an outer end region 134.1 of the second reinforcing layer 134 is foamed into the web 20 of the foam component 10. The outer end region 134.1 runs parallel to the predetermined breaking point 24 but penetrates deeper into the web 20 in the direction of the seat outer face than the predetermined breaking point 24. The outer end region 134.1 penetrates approximately as deeply into the web 20 as an outer end region 32.1 of a first reinforcing layer 32. The remaining region of the second reinforcing layer 134 forms a separating layer between the second flange 22 and the cavity 7 and, starting from the outer end region 134.1, runs in the direction of the seat center and terminates in the inner end region 134.2.

Figure 4:
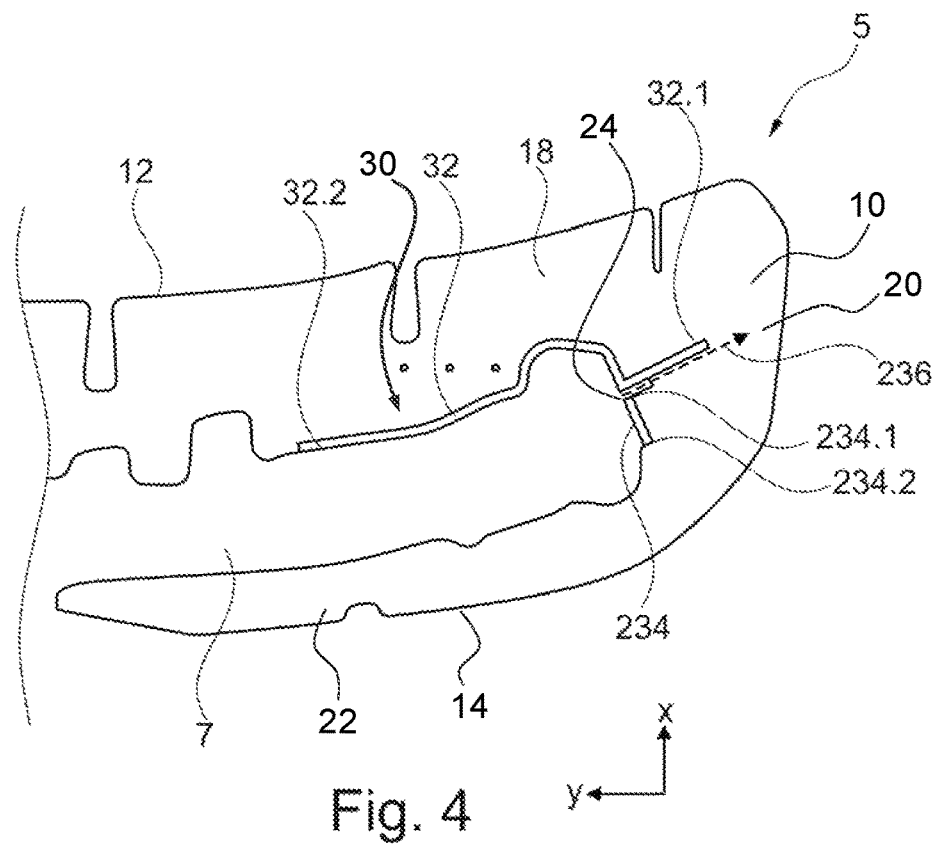

A second modification of the exemplary embodiment shown in FIG. 4 corresponds to the exemplary embodiment shown in FIG. 2, apart from the differences described below, which is why components which are the same or similar-acting bear the same reference numerals. Relative to the exemplary embodiment shown in FIG. 2, only a second reinforcing layer 234 is configured differently. The second reinforcing layer 234 is configured to be smaller relative to the second reinforcing layer 34 of the exemplary embodiment shown in FIG. 2, viewed in the transverse direction y. A tear path 236 is additionally shown in FIG. 4, in the case of an accident said tear path being generated by the deployed airbag starting from a predetermined breaking point 24.

Viewed in the longitudinal direction x, an outer end region 234.1 of the second reinforcing layer 234 comes into contact approximately perpendicularly, in particular perpendicularly, with the predetermined breaking point 24. Starting from the outer end region 234.1, the second reinforcing layer 234 runs in an approximately linear manner and terminates in an inner end region 234.2. The outer end region 234.1 is preferably spaced apart slightly from the first reinforcing layer 32.

Figure 5:
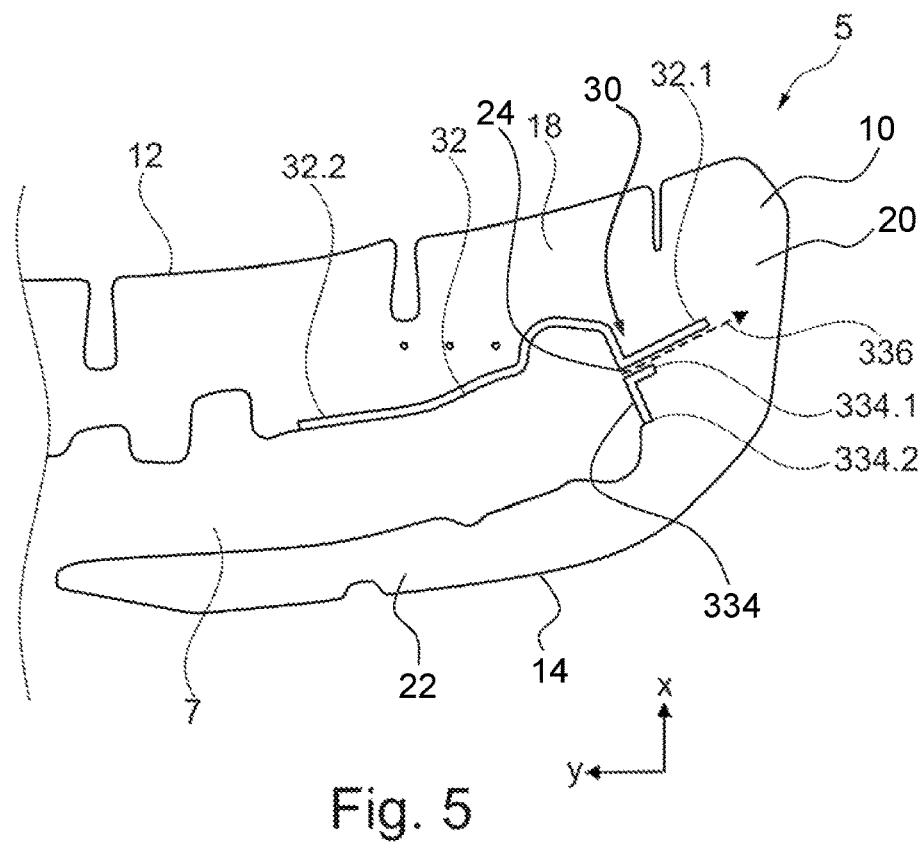

A third modification of the exemplary embodiment shown in FIG. 5 corresponds to the exemplary embodiment shown in FIG. 2, apart from the differences described below, which is why components which are the same or similar-acting bear the same reference numerals. Relative to the exemplary embodiment shown in FIG. 2, only a second reinforcing layer 334 is configured differently. A tear path 336 is additionally shown schematically in FIG. 5, in the case of an accident said tear path being generated by the deployed airbag starting from a predetermined breaking point 24.

The second reinforcing layer 334 is configured differently relative to the second reinforcing layer 34 of the exemplary embodiment shown in FIG. 2, such that an outer end region 334.1 of the second reinforcing layer 334 runs exclusively parallel to a predetermined breaking point 24, without coming into contact with the first reinforcing layer 32. A spacing between the outer end region 334.1 and the first reinforcing layer 32 corresponds approximately to the width of the predetermined breaking point 24 in the longitudinal direction x.

The features disclosed in the above description, the claims and the figures may be significant both individually and in combination for the implementation of the invention in the various embodiments thereof.

Whilst the invention has been described in detail in the figures and the above description, the views are to be understood as illustrative and exemplary and not as limiting. In particular, the choice of the proportions of the individual elements shown by way of illustration are not to be interpreted as necessary or limiting. Moreover, the invention is not limited, in particular, to the described exemplary embodiments and the modifications thereof. Further embodiments of the invention and the modifications thereof result for the person skilled in the art from the above disclosure, the figures and the claims.

Terms such as "comprise", "have", "include", "contain" and the like, which are used in the claims, do not exclude further elements or steps. The use of the indefinite article does not exclude a plurality thereof. An individual device may perform the functions of a plurality of units and/or devices cited in the claims.

LIST OF REFERENCE NUMERALS

1 Vehicle seat
3 Seat part
5 Backrest
7 Cavity
8 Airbag device
10 Foam component
12 Front face
14 Rear face
18 First flange
20 Web
22 Second flange
24 Predetermined breaking point 30 Reinforcing layer arrangement
32 First reinforcing layer
32.1 Outer end region
32.2 Inner end region
34 Second reinforcing layer
34.1 Outer end region
34.2 Inner end region
134 Second reinforcing layer
134.1 Outer end region
134.2 Inner end region
234 Second reinforcing layer
234.1 Outer end region
234.2 Inner end region
236 Tear path
334 Second reinforcing layer
334.1 Outer end region
334.2 Inner end region
336 Tear path
x Longitudinal direction
y Transverse direction
z Vertical direction

What is claimed:

1. A vehicle seat, comprising:
    a seat part and a backrest, said backrest having a foam component with a cavity for receiving at least part of an airbag device,
    wherein the foam component is lined at least to some extent with a reinforcing layer arrangement in the region of the cavity,
    wherein the reinforcing layer arrangement has as least one reinforcing layer with an anti-adhesion coating or laminating on the side of the at least one reinforcing layer facing the airbag device.

2. The vehicle seat as claimed in claim 1, wherein in the case of a deployed airbag of the airbag device, the reinforcing layer arrangement guides the deployed airbag to a predetermined breaking point of the foam component.

3. The vehicle seat as claimed in claim 1, wherein the airbag device is a far-side airbag device.

4. The vehicle seat as claimed in claim 1, wherein the reinforcing layer arrangement has at least one reinforcing layer which is arranged in the foam component.

5. The vehicle seat as claimed in claim 4, wherein the reinforcing layer arrangement has a first reinforcing layer and a second reinforcing layer.

6. The vehicle seat as claimed in claim 5, wherein an outer end region of the first reinforcing layer and an outer end region of the second reinforcing layer receive therebetween the predetermined breaking point.

7. The vehicle seat as claimed in claim 6, wherein the predetermined breaking point is configured as a notch in the foam component.

8. The vehicle seat as claimed in claim 7, wherein the foam component has a first flange, a second flange and a web connecting the first flange to the second flange, which define the cavity.

9. The vehicle seat as claimed in claim 8, wherein the web runs substantially parallel to a plane generated by a longitudinal direction (x) and a vertical direction (z).

10. The vehicle seat as claimed in claim 8, wherein the predetermined breaking point is configured in the web.

11. The vehicle seat as claimed in claim 8, wherein an outer end region of the first reinforcing layer and/or an outer end region of the second reinforcing layer is foamed into the web.

12. The vehicle seat as claimed in claim 11, wherein in the region of the predetermined breaking point of the foam component, an outer end region of the second reinforcing layer is oriented approximately perpendicularly to an outer end region of the first reinforcing layer.

13. The vehicle seat as claimed in claim 11, wherein in the region of the predetermined breaking point of the foam component, an outer end region of the second reinforcing layer runs approximately parallel to an outer end region of the first reinforcing layer.

14. The vehicle seat as claimed in claim 1, wherein at least one reinforcing layer of the reinforcing layer arrangement is produced from a woven material.

15. The vehicle seat as claimed in claim 1, wherein at least one reinforcing layer of the reinforcing arrangement is produced from a plastics material.

* * * * *